(12) United States Patent
Hsiao

(10) Patent No.: US 8,517,321 B2
(45) Date of Patent: Aug. 27, 2013

(54) GRAVITY COMPENSATION APPARATUS

(76) Inventor: Po-Sen Hsiao, Taoyuan (TW)

(*) Notice: Subject to any disclaimer, the term of this patent is extended or adjusted under 35 U.S.C. 154(b) by 129 days.

(21) Appl. No.: 12/979,702

(22) Filed: Dec. 28, 2010

(65) Prior Publication Data

US 2012/0160984 A1    Jun. 28, 2012

(51) Int. Cl.
*E04G 3/00*    (2006.01)

(52) U.S. Cl.
USPC . 248/292.13; 248/575; 248/579; 248/292.14; 248/291.1

(58) Field of Classification Search
USPC ............. 248/291.1, 292.13, 292.14, 575, 248/578, 580, 579, 587, 592, 608, 594, 919, 248/920, 922, 923, 571; 16/319, 348, 357, 16/360, 361, 277, 280, 285, 293, 294, 295, 16/304, 306, 307, 308
See application file for complete search history.

(56) References Cited

U.S. PATENT DOCUMENTS

| 2,737,362 | A | * | 3/1956 | Krone et al. | 403/111 |
| 4,537,233 | A | * | 8/1985 | Vroonland et al. | 141/387 |
| 6,899,308 | B2 |   | 5/2005 | Chow et al. | |
| 7,677,523 | B2 |   | 3/2010 | Stokkermans | |
| 7,766,297 | B2 | * | 8/2010 | Chih | 248/349.1 |

* cited by examiner

*Primary Examiner* — Terrell McKinnon
*Assistant Examiner* — Eret McNichols
(74) *Attorney, Agent, or Firm* — Rabin & Berdo, P.C.

(57) ABSTRACT

A gravity compensation apparatus is provided, including a force output device, an axis and an arm with the axis as rotational center. The present invention is to output a force via the force output device to the arm when the arm contacts the force output device. When the arm rotates in the first or second quadrants, the contact point between the arm and the force output device will change continuously so that the force rotation speed of the force output device, the effective length of the lever arm and the force-applying angle will also change accordingly. Through appropriate design, the generated torque value can show a non-linearly increasing curve approximately to a sin function between 0-90°.

4 Claims, 13 Drawing Sheets

GRAVITY COMPENSATION APPARATUS

FIELD OF THE INVENTION

The present invention generally relates to a gravity compensation apparatus, and more specifically to an apparatus able to provide a compensation torque to an object rotating in the first and second quadrants with respect to an axis to offset the effect of gravity on the object when the object using the axis as center of rotation.

BACKGROUND OF THE INVENTION

For various equipments, a gravity compensation force applied to an object may be beneficial if to move or rotate the object of mass. With a gravity compensation apparatus able to offset partially or completely the gravity, a smaller force can be applied to move or rotate the object. In addition, a simpler structure may be used in design because the mechanism to generate the required force is simpler, leading to a cost-down in the manufacturing expense.

FIG. 1 shows a schematic view of a conventional gravity compensation technique. Object 11 has a mass W, and is able to rotate around axis 12 as a center. The distance between the center of mass of object 11 and axis 12 is L. The gravity compensation mechanism is a torsion spring 13 installed at the center of axis 12. A fixed lever 131 of torsion spring 13 is fixed, and movable lever 132 rotate synchronously with object 11. Hence, torsion spring 13 is used to compensate or eliminate the effect of gravity during the rotation of object 11 from 0-90°. The spring torque coefficient of torsion spring is $K_M$, and $\theta$ is the rotation angle of the object. Then, Torque of axis 12=$W \times L \times \sin \theta$, Compensation torque of torsion spring=$k_M \times \theta$ where W, L are constant, and sine is a non-linearly increasing curve. Therefore, the obtained torque changing with $\theta$ is non-linearly increasing. However, torsion spring 13 is a linear spring providing a linear increasing compensation torque. Hence, this type of gravity compensation technique fails to satisfy the torque change caused by the gravity change.

To solve this problem, U.S. Pat. No. 6,899,308 disclosed a passive gravity compensating mechanisms, using two sets of rotational mechanisms with non-spherical surface, in combination with two sets of springs connected to the aforementioned mechanism to achieve gravity compensation. A preferred embodiment of the patent in structure is to use a pair of non-spherical gears, which leads to manufacturing difficulty and high cost. In addition, the restrictions of material strength (metal gear) and matching precision are more prominent when miniaturizing the product.

U.S. Pat. No. 7,677,523 disclosed a gravity compensation device. The disadvantage of the structure of the disclosed gravity compensation device is that the structure fails to simulate the gradually decreasing part of the trigonometry slope. If the radius of gear retracts and the resilient cable fails to contact the retracted part, the cable will be pushed by the relatively protruding front part. Also, the distance between the load and the gravity compensation device changes as the radius of the gear changes, or the angle to apply the force changes when the distance remains the same.

SUMMARY OF THE INVENTION

The primary objective of the present invention is to provide a gravity compensation apparatus, applicable to an axis to compensate or eliminate the effect of the gravity on an object connected to the axis during rotation so that a smaller force can be applied to drive the rotation around the axis.

To achieve the above objective, the present invention provides a gravity compensation apparatus, including a force output device, an axis and an arm with the axis as rotational center. The present invention is to output a force via the force output device to the arm when the arm contacts the force output device. When the arm rotates in the first or second quadrants, the contact point between the arm and the force output device will change continuously so that the force rotation speed of the force output device, the effective length of the lever arm and the force-applying angle will also change accordingly. Through appropriate design, the generated torque value can show a non-linearly increasing curve approximately to a sin function between 0-90°.

Furthermore, the gravity compensation apparatus of the present invention further includes a box, where the force output device, the axis and the arm are all located inside. The axis extends from inside the box. The force output device includes a sliding element and a torsion spring. The center of the torsion spring is located at the sliding element. The sliding element can pull the torsion spring so that the rotational angle of the sliding element is the same as the rotational angle of the torsion spring. The center of the sliding element is located inside the rotational path of the arm. When the arm rotates, a contact element of the arm will contact and push the sliding element. The torsion spring provides a force to the contact point on the arm via the sliding element. As the axis continues rotating, the contact point on the sliding element by the contact element of the arm will also change.

According to the present invention, the force output device can be a torsion spring. A device base is used to accommodate the axis and the torsion spring. The torsion spring includes a spiral segment and a fixed lever and the movable lever extending both the spiral segment. The fixed lever is fixed to the inside of the device base and the movable lever contacts the contact element of the arm. The contact point on the movable lever by the contact element will change as the arm rotates. In this manner, the gravity compensation apparatus is accomplished, wherein the arm can directly link to the object to rotate.

The foregoing and other objectives, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
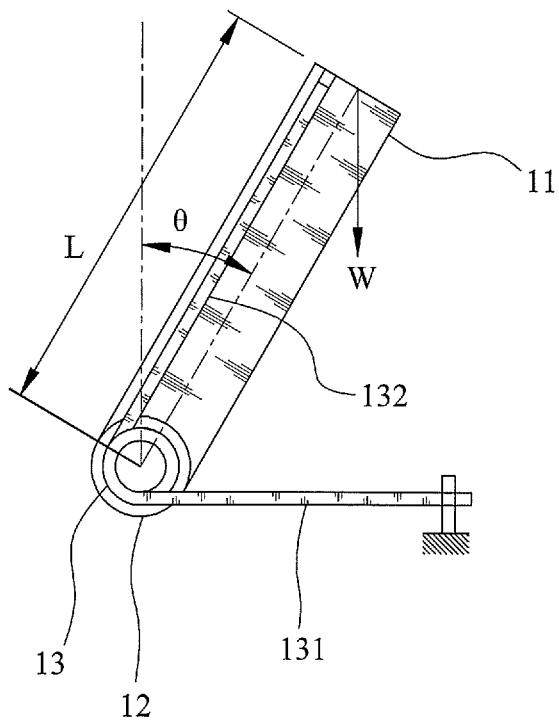
FIG. 1 shows a schematic view of a conventional gravity-compensating device.
Figure 2:
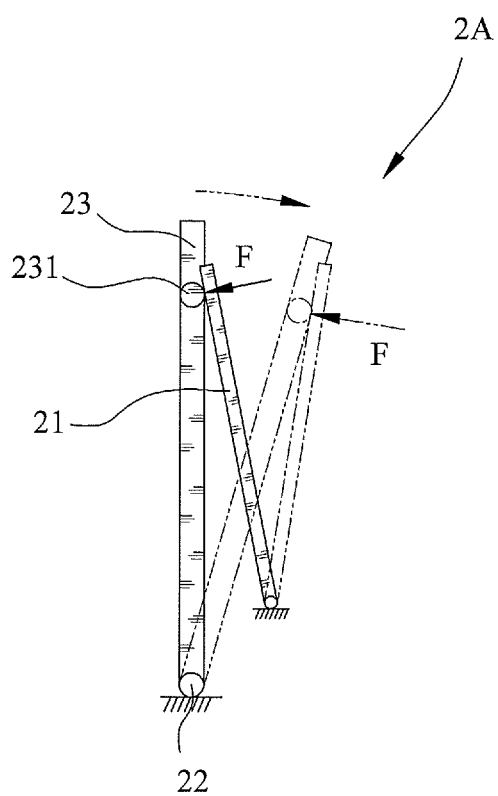
FIG. 2 shows a schematic view of the present invention.

FIG. 2 shows a schematic view of a basic model of the gravity compensation apparatus of the present invention. Gravity compensation apparatus 2A includes a force output device 21, an axis 22 and an arm 23 able to rotate around axis 22. The rotation range of arm 23 is limited to the first quadrant in this embodiment. Arm 23 includes a contact element 231. Contact element 231 maintains a fixed distance from the center of axis 22. The center of force output device 21 is located inside the rational path of arm 23. When rotating, arm 23 uses contact element 231 to contact force output device 21. As the angle changes during the rotation, the contact point on force output device 21 by contact element 231 continues to change. Force output device 21 must generate a force F when contacting contact element 231. Force F will increase as the rotational angle increases. Therefore, force output device 21 of the present invention includes a torsion spring, with center located at the center of the rotation with the force output device. The details of the torsion spring will be described later. However, the use of torsion spring is only illustrative, not restrictive. Other linear springs, such as, stretching spring can also be used. When arm 23 rotates, the contact point on force output device 21 by arm 23 will continue changing so that the rotation speed of force output device 21, the effective length of the lever arm 21, force-applying angle to contact element 231 will also change. By precise calculation and design, the torque output of such a device can show a non-linearly increasing curve approximate to a sin function ranging from 0-90° as the rotation angle changes. However, the embodiment is illustrative, not restrictive. Therefore, different non-linearly increasing force can be designed to meet different requirements.

Figure 3:
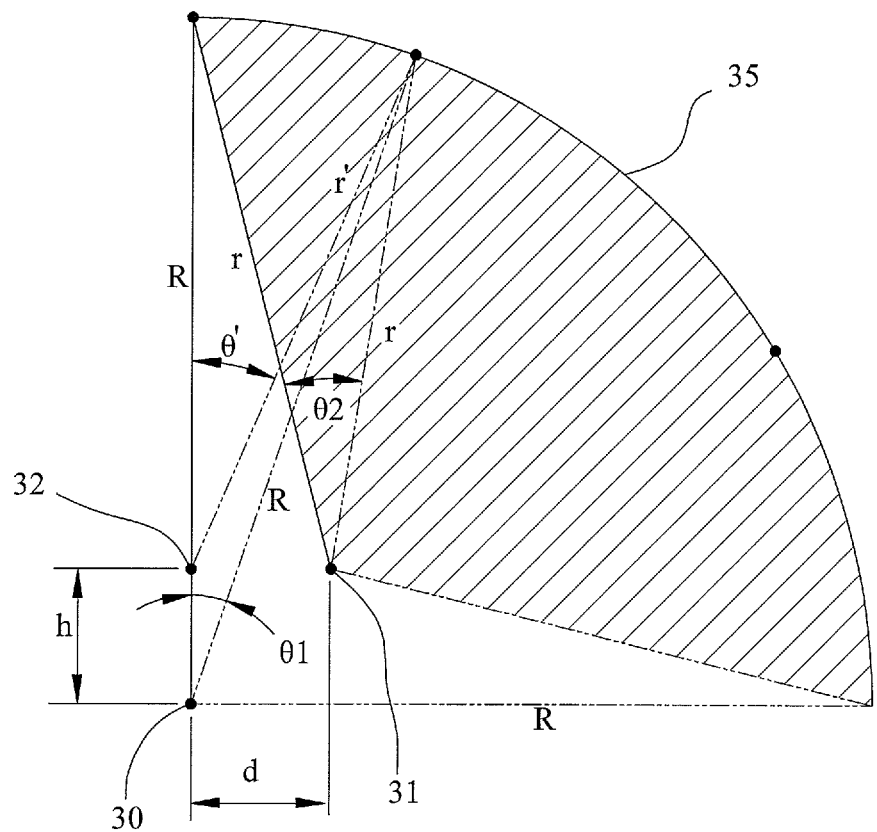
FIG. 3 shows a schematic view of mathematic computation of the present invention.

FIG. 3 shows a schematic view of the theory of the design of the present invention. Point 30 is the center of the axis. Point 31 is the center of the force output device. The arm rotates in the first quadrant. The dots on the outside indicate the contact point of the arm and the force output device. As the arm rotates, the relative distance between the contact point and Point 31 (r) changes. Arc 35 indicates the trajectory of the dot. The fixed distance between the contact element on the arm and the axis center is R. The contact element pushes the force output device So that the force output device executes the angular rotation of the area indicated with slanted line pattern. The implementation of the present invention is based on the following three factors:

1. When the arm rotates with respect to the axis for θ1, the force output device rotates for θ2, wherein θ1 and θ2 have a non-linear relation;
2. Distance r from the contact point of the arm and the force output device to the center of the force output device changes as the rotation angle changes; and
3. At each contact point on the force output device, the force from the force output device and the arm form a different in-between angle.

Accordingly, the torque output at the axis of the present is:

Torque outputted by force output device at the point×
(R/r)×cos(in-between angle of force output
device and the arm)

Based on the above description, the present invention provides the following formula. As aforementioned, point 30 is the center of the axis, and point 31 is the center of the force output device. The relative position of point 31 to point 30 is (d, h). Point 32, θ' and r' are auxiliary for explaining the formula. K is the spring torque constant coefficient. The formula is as follows:

$$R*\sin\theta 1 = r'*\sin\theta' \to r' = \frac{R*\sin\theta 1}{\sin\theta'}$$

$$\frac{R*\cos\theta 1 - h}{R*\sin\theta 1} = \cot\theta' \to \theta' = \tan^{-1}\frac{R*\sin\theta 1}{R*\cos\theta 1 - h}$$

$$r'*\cos\theta' = r*\cos\left(\theta 2 - \tan^{-1}\frac{d}{R-h}\right) \to r$$

$$= \frac{r'*\cos\theta'}{\cos\left(\theta 2 - \tan^{-1}\frac{d}{R-h}\right)}$$

$$\frac{r'*\sin\theta' - d}{r'*\cos\theta'} = \tan\left(\theta 2 - \tan^{-1}\frac{d}{R-h}\right) \to \theta 2$$

$$= \tan^{-1}\frac{r'*\sin\theta' - d}{r'*\cos\theta'} + \tan^{-1}\frac{d}{R-h}$$

Angle between $R$ and $r = \left(\theta 2 - \theta 1 - \tan^{-1}\frac{d}{R-h}\right)$ Torque $= k*\theta 2*R/r*\cos\left(\theta 2 - \theta 1 - \tan^{-1}\frac{d}{R-h}\right)$ Therefore, once R, h and d are set, the values of θ2 and r corresponding any θ1 can be computed by the above formula. Also, the output torque at that angle by the present invention can also be obtained.

Figure 4:
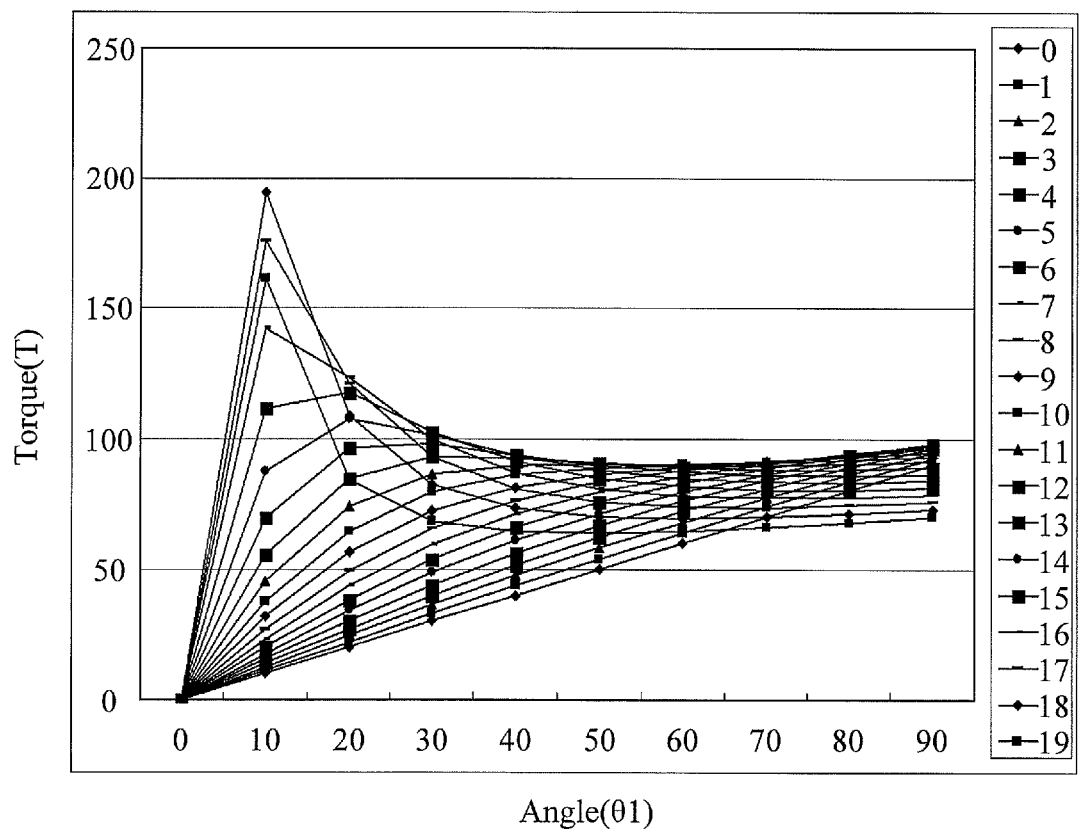
FIG. 4 shows a schematic view of the first simulated results of the relation between the torque and the angle according to the present invention.
Figure 5:
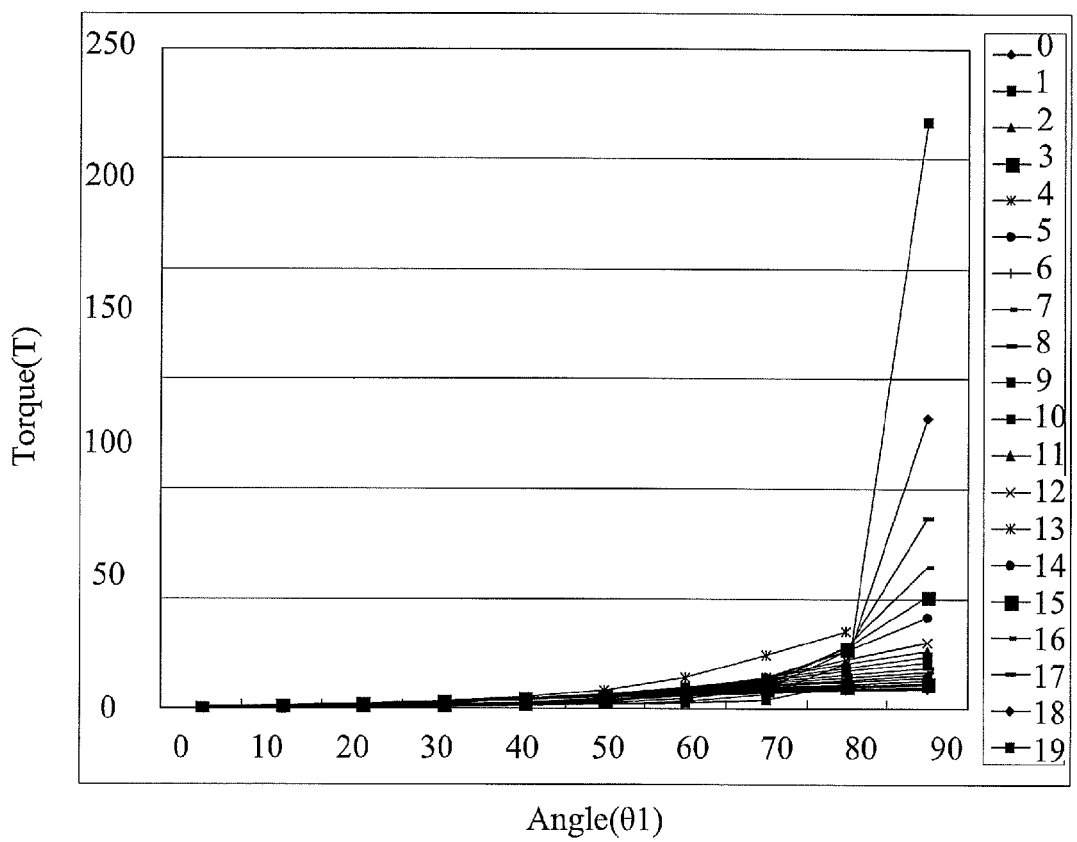
FIG. 5 shows a schematic view of the second simulated results of the relation between the torque and the angle according to the present invention.

FIG. 4 and FIG. 5 show the simulated results of the relation between torque and angle θ1. In FIG. 4, the curve shows the torques when R=20, d=0, and h increasing from 0 to 19. As shown in FIG. 4, when h increases, the torque curve shifts from lower right to the upper left. In FIG. 5, the curve shows the torques when R=20, h=0, and d increasing from 0 to 19. As shown in FIG. 5, when d increases, the torque curve shifts from lower left to the upper right. Based on the above, when an actual torque curve on the object for gravity compensation, the present invention can compute the R according to the size of the compensation apparatus. Then, approximate h and d values are assumed, and a hypothesis torque curve is obtained by the formula, compared to the actual torque curve. Finally, following the logic shown in FIG. 4 and FIG. 5, by tuning the h and d values, the R, h and d values for the gravity compensation apparatus most approximately to the actual torque curve can be obtained.

Figure 6:
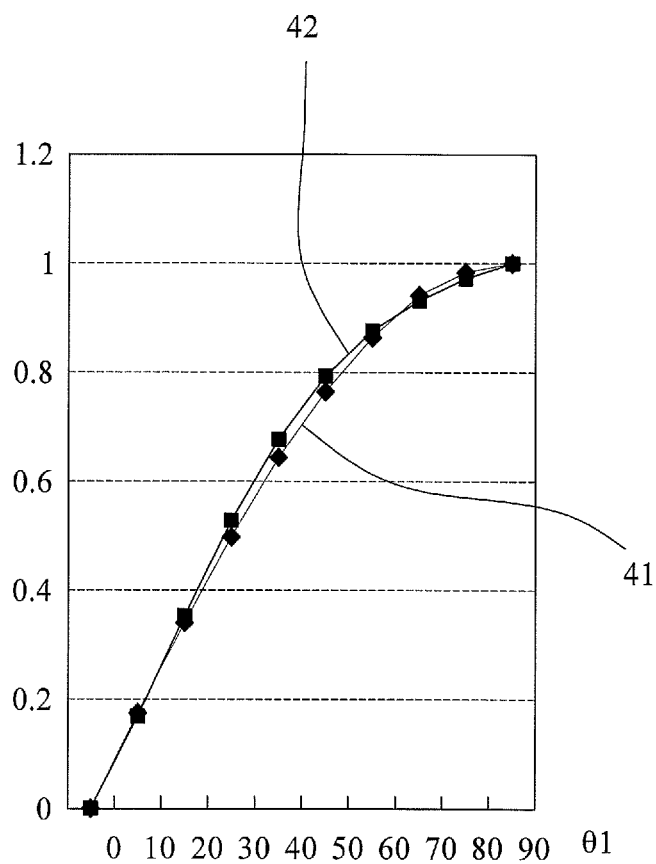
FIG. 6 shows a schematic view of the analysis of torque and angle.

FIG. 6 shows a comparison table of the relation of the torque and angle for a rotating object according to the present invention. The figure is based on the above computation formula to obtain the preferred values of the parameters for the present invention, wherein R=25 mm, h=7.1375 mm and d=3.3125 mm. Let the torque when vertically placed (90°) as 1 unit, curve 41 in the figure shows the torque increasing curve for the object rotating from vertical position to horizontal position. As the curve shows, the torque is non-linearly increasing due to gravity. Curve 42 shows the torque increasing curve generated by the gravity compensation apparatus of the present invention. As shown in FIG. 6, two curves have close trajectories. Hence, when installing the present invention at a rotational axis of an object, the present invention can compensate the gravity effect during rotation so that a small-force driver can drive the object.

The following shows an actual application of the present invention. In the following embodiments, torsion springs is used as the force output device. Because the diameter of the torsion spring will affect the rotation angle, the present invention will describe the structure and then discuss the impact.

Figure 7:
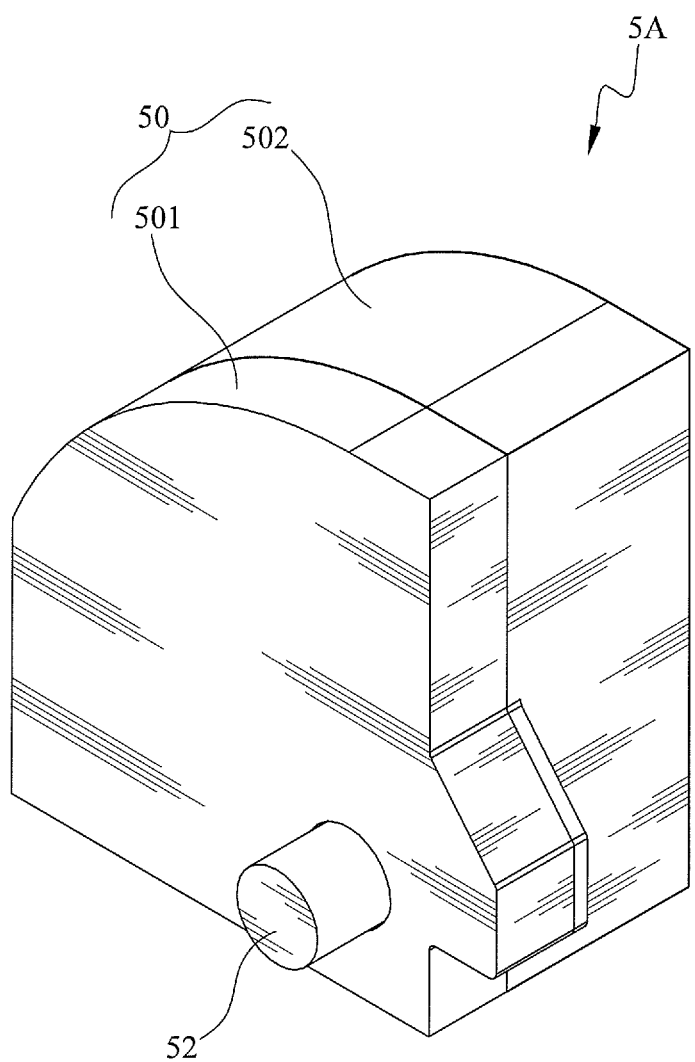
FIG. 7 shows a schematic view of the first embodiment of the present invention applied to a product.
Figure 8:
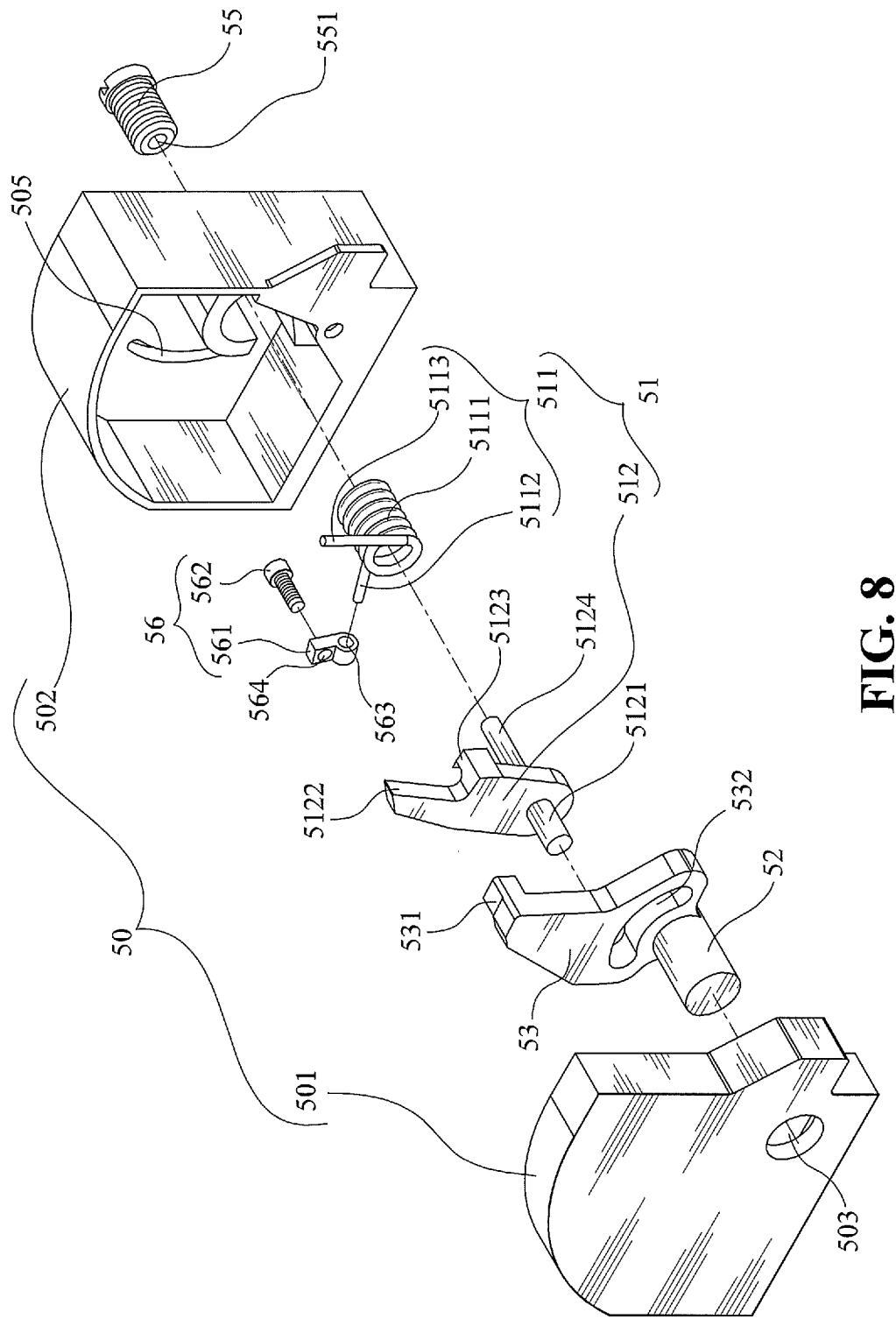
FIG. 8 shows a dissected view of the first embodiment of the present invention applied to a product.

FIG. 7 and FIG. 8 show a schematic view and a dissected view of the first embodiment of the application of the theory of the present invention to a product. Gravity compensation apparatus 5A of the present invention includes a box 50, a force output device 51, an axis 52, and an arm 53. Box 50 is a hollow box made of a lid 501 and a container 502 for accommodating force output device 51, axis 52, and arm 53. Lid 501 includes an axis hole 502 for axis 52 to extend out. Axis 52 is connected to arm 53. Arm 53 has a contact element 531. Contact element 531 maintains a fixed distance from the center of axis 52. Force output device 51 includes a torsion spring 511 and a sliding element 512. Torsion spring 511 includes a spiral segment 5111, and a fixed lever 5112 and a movable lever 5113, both extending from the spiral segment. Sliding element 512 has a central lever 5121. Central lever 5121 is fixed to the inside of box 50 so that sliding element 512 can rotate around central lever 5121. Arm 53 includes an arc guiding groove 532 for central lever 5121 to pass so that central lever 5121 will not interfere with the rotation of arm 53. Sliding element 512 includes a sliding surface 5122 and a hook element 5123. Sliding surface 5122 is to provide contact with contact element 531, lever arm length of force output device 51 is determined by the distance between the center of the central lever 5121 and the contact element 531 sliding about the sliding surface 5122. Hook element 5123 is for buckling movable lever 5113 of torsion spring 511. The position of fixed lever 5112 is fixed to the inside box 50.

Figure 9:
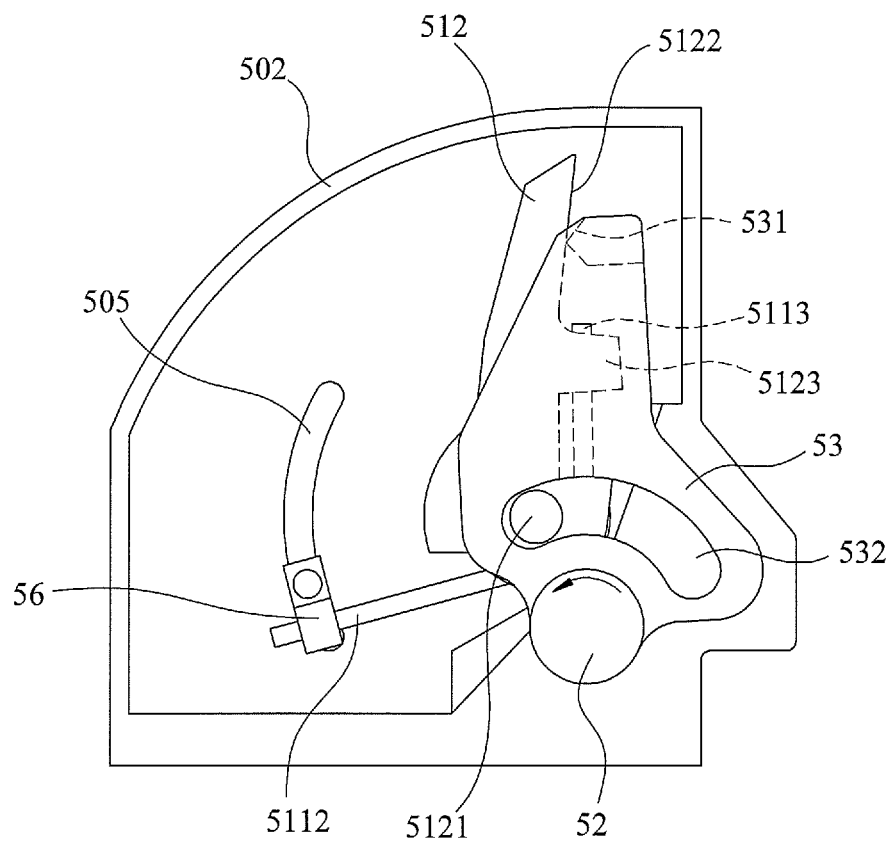
FIG. 9 shows a schematic view of the operation of the first embodiment.

As shown in FIG. 9, when axis 52 rotates, arm 53 rotates synchronously. Sliding element 512, because of being buckled by hook element 5123 to one side of movable lever 5113 of torsion spring 511. When contact element 531 on arm 53 slides about the sliding surface 5122 of sliding element 512, the torque due to the twist from torsion spring 5111 will provide sliding element 512 with a force to apply to contact element 531 of arm 53. As the rotation angle of axis 52 increases, the contact point on sliding surface 5122 by contact element 531 changes and the rotation speed of force output device 51, lever arm length of force output device 51 and force-applying angle to contact element 531 also change accordingly. Hence, the torque on axis 52 shows a non-linearly increasing trend.

Figure 10:
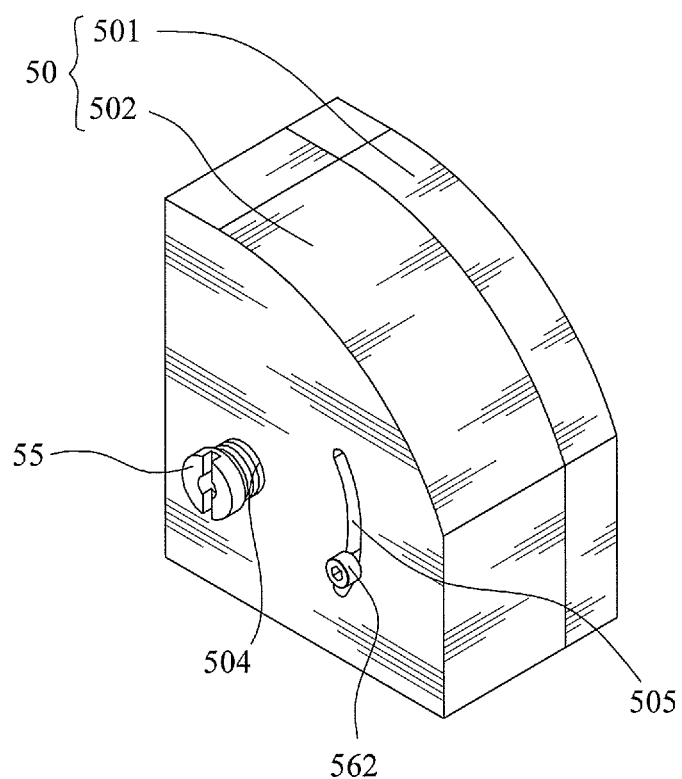
FIG. 10 shows a schematic view of the first embodiment from a different perspective.

To satisfy actual application, the above embodiment may further include the fine-tuning capability to provide the user to calibrate or adjust the final torque output of axis 52. As shown in FIG. 8 and FIG. 10, gravity compensation apparatus 5A further includes an adjustment screw 55 and a position lock element 56. The wall of container 502 of box 50 has a screw hole 504 for adjustment screw 55. Adjustment screw 55 has a blind hole 551, for accommodating a central lever 5124 with smaller diameter than central lever 5121 of sliding element 512. The outer diameter of adjustment screw 55 is equal to or slightly larger than the inner diameter of spiral segment 5111 of torsion spring 511. When adjustment screw 55 locks in to spiral segment 5111, the number of effective spiral turns of torsion segment 5111 will change, and so will the coefficient of the torsion spring. In this manner, the torque of the axis is changed. Position lock element 56 includes a holding element 561 and a screw 562. The wall of container 502 forms an arc groove 505. Holding element 561 includes a connection hole 563 to accommodate insertion of fixed lever 5112 of torsion spring 511. Holding element 561 has a screw hole 564 for accommodating and engaging screw 562 from outside via arc groove 505 to screw-lock. In this manner, fixed lever 5112 of torsion spring 511 can be fixed to the inside wall of container 502 at different angles. Because the outer diameter of adjustment screw 55 is slightly larger than the inner diameter of spiral segment 5111 of torsion spring 511, the screw-in or the release of adjustment screw 55 from spiral segment 5111 will change the open-up angle of torsion spring 511 so as to provide a room for fine-tuning.

Figure 11:
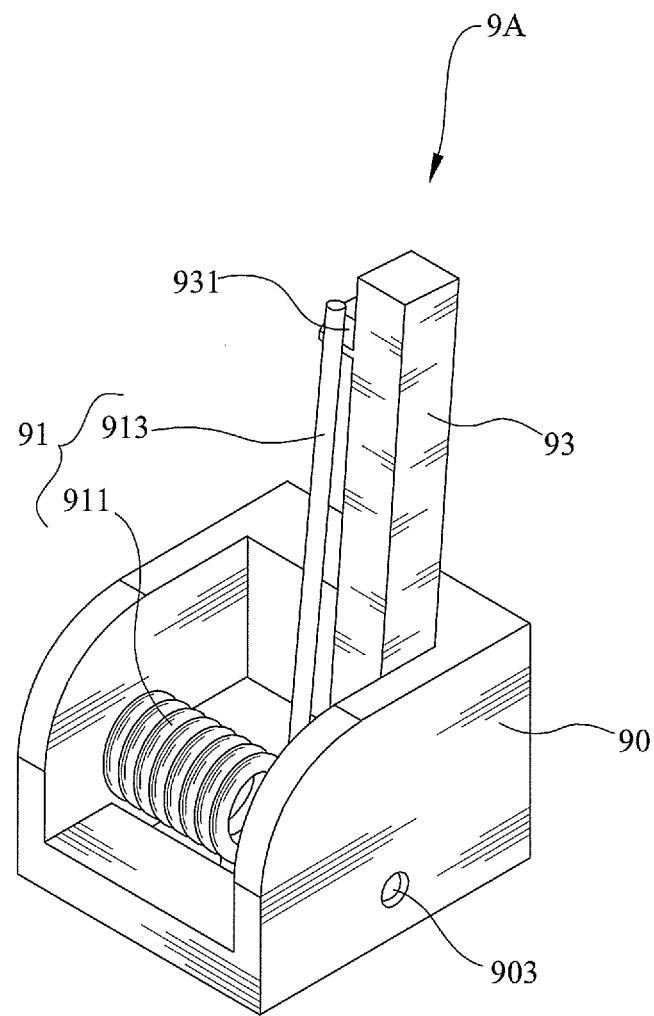
FIG. 11 shows a schematic view of the second embodiment of the present invention applied to a product.
Figure 12:
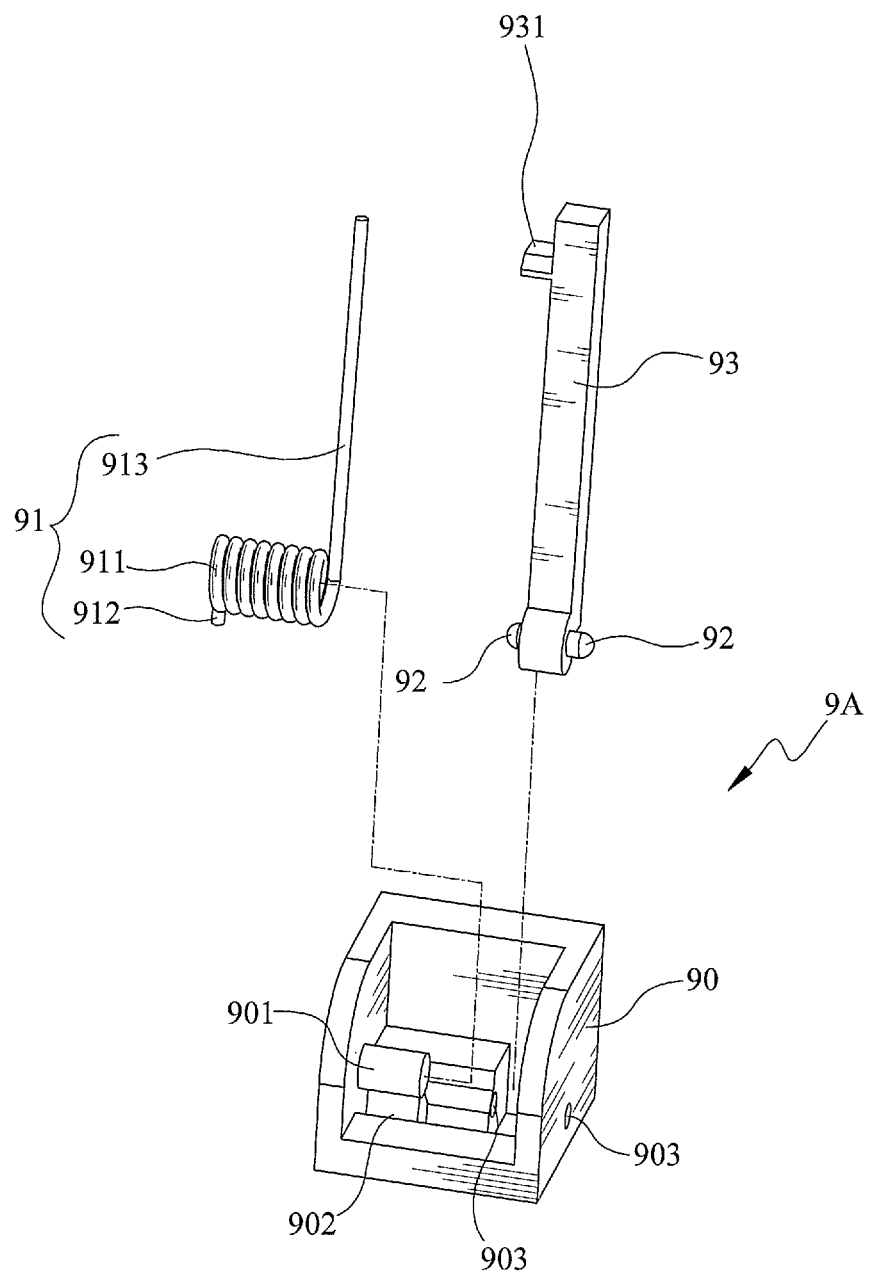
FIG. 12 shows a dissected view of the second embodiment of the present invention applied to a product.

FIG. 11 and FIG. 12 show a schematic view and a dissected view of the second embodiment of the application of the theory of the present invention to a product. Gravity compensation apparatus 9A of the present invention includes a device base 90, a force output device, an axis 92, and an arm 93. The force output device is a torsion spring 91. Torsion spring 91 includes a spiral segment 911 and a fixed lever 912 and a movable lever 913, both extending from spiral segment 911. Device base 90 is an open space for accommodating the force output device, axis 92, and arm 93. Device base 90 has a central axis 901, inserted to the center of spiral segment 911 of torsion spring 91 to hold torsion spring 91 in place. The lower part of central axis 901 inside device base 90 further includes a blocking groove 902 for the insertion of fixed lever 912 to hold it in place. The inside of device base 90 further includes a set of axis holes 903 in symmetric arrangement to provide the insertion of axis 92. Axis holes 903 are not on the same central line as central axis 901. The center of central axis 901 relative to the center of axis holes 903 is set according to the before-mentioned rules. Arm 93 further includes a contact element 931, keeping a fixed distance from axis 52. When arm 93 rotates, contact element 931 maintains contact with movable lever 913, and pushes movable lever 913 to rotate. The contact point on movable lever 913 by contact element 931 changes with the rotation angle of arm 93.

The embodiment of FIG. 11 and FIG. 12 is of a simpler design. The torque of axis 92 of gravity compensation apparatus 9A still increase in non-linear mode as rotation angle increases. The present embodiment is only applicable to torsion spring with sufficiently small diameter, while h and d are sufficiently large, and the effect of torsion spring diameter on said device is discarded. In this embodiment, arm 93 can be directly connected to the object to rotate, instead of connecting the object to axis 92.

Figure 13B:
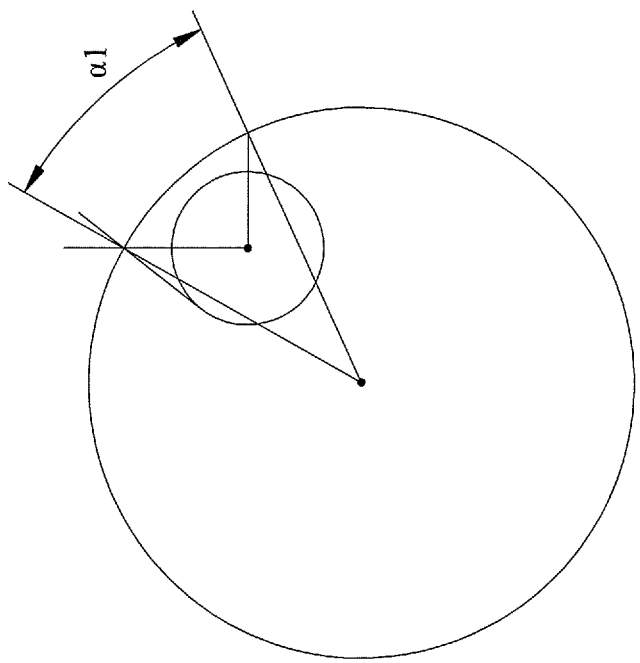
FIG. 13B shows a schematic view of the axis rotation angle of an ideal torsion spring applied to the present invention
Figure 13A:
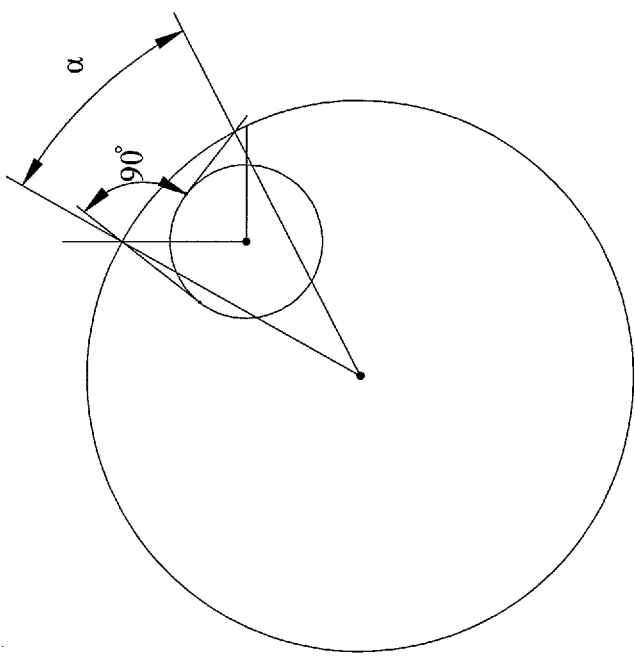
FIG. 13A shows a schematic view of the axis rotation angle of a common torsion spring applied to the present invention.

In the above two embodiments, torsion spring is used as force output device. However, in actual application, the diameter of torsion spring must be taken into account. In actual application, the rotation center will move and will affect the rotation angle, as shown in FIG. 13A and FIG. 13B. FIG. 13A is a torsion spring, and FIG. 13B is an ideal torsion spring device. When starting with the same angle, after rotating for 90°, the rotation angles of output axis of two torsion springs, i.e., $\alpha$ and $\alpha 1$, are different. The feedback force of torsion spring to the rotation angle of the arm is affected and the rotation center of the torsion spring in FIG. 13B moves along the circumference. Therefore, in the first embodiment of the present invention a sliding element and a torsion spring constitute a force output device. By using a sliding element to align the torsion spring center to the axis center and fixing a movable lever of the torsion spring, the device can be viewed as an ideal torsion spring. The rotation center of the sliding element will not change and the rotation angle of the torsion spring is the same as the sliding element.

In summary, the present invention uses a force output device (e.g., torsion spring) to provide a force on the arm in contact. As the arm rotates, the contact point changes so that the rotation speed of force output device, the effective length of the lever arm of said force output device, force-applying angle will also change. In this manner, the axis connected to the arm can generate a non-linearly increasing torque so that the overall apparatus can compensate the effect of the gravity on an object during rotation.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A gravity compensation apparatus, comprising:
   a base unit;
   an arm pivotably attached to said base unit for swivel movement, said arm having a contact element located at a fixed distance from a pivot center of the arm;
   a force output device comprising:
   a sliding element having a sliding surface; and
   a torsion spring with one end held by said base unit and another end held by said sliding element,
   wherein a center of said torsion spring is located on said sliding element, said sliding element for pushing/pulling said torsion spring so that a rotation angle of said sliding element is the same as a rotation angle of said torsion spring;
   wherein said sliding element is pivotally attached to said base unit with said center of said torsion spring as a pivot center of the sliding element and said center of said torsion spring is located between a rotational path of said arm and a center of rotation of the arm;
   wherein when said arm rotates, said contact element of said arm slides on said slide surface of said sliding element.

2. The apparatus as claimed in claim 1, where said base unit is a box that accommodates said base unit, said arm, and said force output device.

3. The apparatus as claimed in claim 2, further comprising an adjustment screw,
   wherein a wall of said box has the adjustment screw protruding therethrough,
   wherein said torsion spring further comprises a spiral segment, a fixed lever extending from said spiral segment and a movable lever extending from said spiral segment,
   wherein an end of said adjustment screw extends into said box and is located inside said spiral segment, the adjustment screw is interlocked with the spiral segment so that when said adjustment screw is tightened, an effective number of turns of said torsion spring is changed.

4. The apparatus as claimed in claim 3, further comprising a position lock element,
   wherein the wall of said box has the position lock element protruding therethrough so that a position of said position lock element can change on said wall,
   said position lock element also locks a position of said fixed lever.

* * * * *